UNITED STATES PATENT OFFICE.

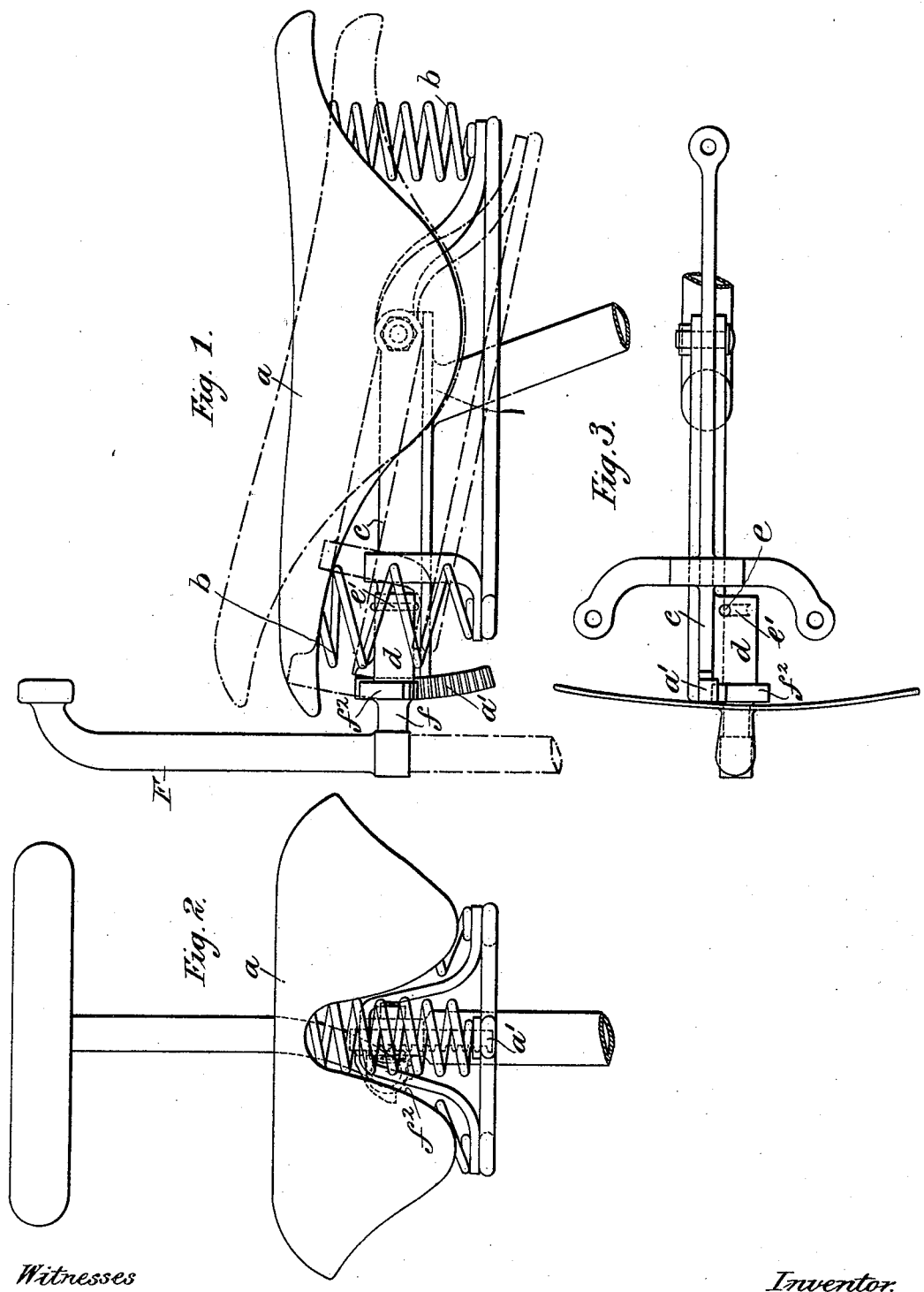

WILLIAM ELLIS CHUTE ELLIS, OF PETERSFIELD, ENGLAND.

SEAT-BACK.

SPECIFICATION forming part of Letters Patent No. 621,049, dated March 14, 1899.

Application filed March 14, 1898. Serial No. 673,761. (No model.)

*To all whom it may concern:*

Be it known that I, WILLIAM ELLIS CHUTE ELLIS, a subject of the Queen of Great Britain, residing at The Knolls, near Petersfield, in the county of Hants, England, have invented certain new and useful Seat-Backs, of which the following is a specification.

This invention relates to backs for seats especially suitable for cycles, but also applicable in other cases.

The back is mounted on a longitudinal axis, so that it can be turned down sidewise out of the way. A rack is fixed to the under side of the seat, and a pinion is fixed to a shaft connected with the back and gears with the rack, so that when the seat is depressed the back is lifted into position behind the seat, but when the seat is raised, as when the rider or occupant dismounts, the back is automatically lowered.

In the accompanying drawings, Figure 1 is a side elevation, and Fig. 2 a front elevation, of a cycle-saddle fitted with a back constructed in accordance with this invention. Fig. 3 is a plan view of the back and part of the seat-frame.

$a$ is a saddle, which is supported in the ordinary way by springs $b$ on a horizontal bar $c$.

$d$ is a tube secured directly to the bar $c$, and $f$ is a rod which supports the back F and having a bearing in the tube $d$. The rod $f$ has a pinion $f^2$ upon it, which gears with a rack $a'$, fixed to the under side of the saddle $a$. The weight of the rider depresses the saddle and causes the rack $a'$ to revolve the pinion $f^2$ and raise the back. When the rider dismounts, the saddle will rise, as indicated by dotted lines, the pinion will be reversed in its movement, and the seat-back will be lowered. A stud $e$, secured to the rod $f$, extends through a slot $e'$ in the tube $d$ and prevents the rod $f$ from moving longitudinally out of its bearings, but permits it to turn therein.

What I claim is—

The combination of a seat, springs carrying the seat, a support carrying the springs, a horizontal longitudinal bearing carried by the support, a shaft turning in the bearing, a back fixed to the shaft, a rack fixed to the under side of the seat and a pinion fixed to the shaft and gearing with the rack.

WILLIAM ELLIS CHUTE ELLIS.

Witnesses:
 FREDK. C. WEATHERBY,
 ROBERT B. RANSFORD.